(12) United States Patent
Yamada et al.

(10) Patent No.: US 11,145,907 B2
(45) Date of Patent: Oct. 12, 2021

(54) METHOD FOR PRODUCING SECONDARY BATTERY HAVING NEGATIVE ELECTRODE WITH DIFFERENT SURFACE ROUGHNESSES

(71) Applicant: SANYO ELECTRIC CO., LTD., Daito (JP)

(72) Inventors: Tomoyuki Yamada, Hyogo (JP); Ryosuke Shirota, Osaka (JP); Tetsuya Matsuda, Hyogo (JP); Kazuma Mima, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 127 days.

(21) Appl. No.: 15/921,861

(22) Filed: Mar. 15, 2018

(65) Prior Publication Data

US 2018/0287214 A1 Oct. 4, 2018

(30) Foreign Application Priority Data

Mar. 28, 2017 (JP) .............................. JP2017-063442

(51) Int. Cl.
*H01M 10/0587* (2010.01)
*H01M 10/0585* (2010.01)
(Continued)

(52) U.S. Cl.
CPC ..... *H01M 10/0587* (2013.01); *H01M 4/0404* (2013.01); *H01M 4/13* (2013.01); *H01M 4/134* (2013.01); *H01M 4/661* (2013.01); *H01M 4/662* (2013.01); *H01M 10/052* (2013.01); *H01M 10/0585* (2013.01); *H01M 50/103* (2021.01);
(Continued)

(58) Field of Classification Search
CPC ......... H01M 2004/027; H01M 2/0217; H01M 2/263; H01M 4/134; H01M 4/661
See application file for complete search history.

(56) References Cited

U.S. PATENT DOCUMENTS

| 9,397,343 B1* | 7/2016 | Cheng | H01M 4/661 |
| 2003/0148136 A1* | 8/2003 | Yamamoto | C25D 1/04 |
| | | | 428/607 |

(Continued)

FOREIGN PATENT DOCUMENTS

| JP | 9-306504 A | 11/1997 |
| JP | 2012-33334 A | 2/2012 |

(Continued)

*Primary Examiner* — Imran Akram
(74) *Attorney, Agent, or Firm* — Westerman, Hattori, Daniels & Adrian, LLP

(57) ABSTRACT

Provided is a method for producing a non-aqueous electrolyte secondary battery. A negative electrode core of a negative electrode plate has front and back surfaces each with a surface roughness different from the other Rz. In a wound electrode body, a wound negative electrode core-exposed portion is formed at one end portion in the winding axis direction. In the wound negative electrode core-exposed portion, the surface roughness of the negative electrode core-exposed portion on the outer surface side is lower than the surface roughness on the inner surface side. A negative electrode current collector is placed on the outer surface of the wound negative electrode core-exposed portion and the negative electrode current collector is resistance-welded to the wound negative electrode core-exposed portion.

2 Claims, 5 Drawing Sheets

(51) Int. Cl.
  H01M 4/66 (2006.01)
  H01M 4/134 (2010.01)
  H01M 2/08 (2006.01)
  H01M 2/02 (2006.01)
  H01M 10/052 (2010.01)
  H01M 4/13 (2010.01)
  H01M 4/04 (2006.01)
  H01M 50/103 (2021.01)
  H01M 50/183 (2021.01)
  H01M 50/538 (2021.01)
  H01M 4/02 (2006.01)

(52) U.S. Cl.
  CPC ....... H01M 50/183 (2021.01); H01M 50/538 (2021.01); H01M 2004/027 (2013.01); H01M 2004/028 (2013.01)

(56) References Cited

U.S. PATENT DOCUMENTS

| | | | | |
|---|---|---|---|---|
| 2007/0231698 | A1* | 10/2007 | Kawase | H01M 10/0569 |
| | | | | 429/233 |
| 2008/0138716 | A1* | 6/2008 | Iwama | H01M 4/1395 |
| | | | | 429/338 |
| 2008/0176144 | A1* | 7/2008 | Iwama | H01M 4/134 |
| | | | | 429/338 |
| 2012/0028088 | A1* | 2/2012 | Hattori | H01M 2/0217 |
| | | | | 429/53 |
| 2012/0202101 | A1 | 8/2012 | Ueda | |
| 2012/0202117 | A1* | 8/2012 | Hirose | H01M 4/622 |
| | | | | 429/211 |
| 2012/0301783 | A1* | 11/2012 | Shimada | H01M 4/70 |
| | | | | 429/211 |
| 2013/0108922 | A1* | 5/2013 | Shinozaki | H01M 4/70 |
| | | | | 429/211 |
| 2014/0017564 | A1* | 1/2014 | Suzuki | C25D 5/16 |
| | | | | 429/211 |
| 2014/0193660 | A1* | 7/2014 | Tsai | C25D 1/04 |
| | | | | 428/606 |
| 2017/0117552 | A1* | 4/2017 | Jeong | H01M 4/661 |

FOREIGN PATENT DOCUMENTS

| | | | | |
|---|---|---|---|---|
| WO | 2012/001885 A1 | 1/2012 | | |
| WO | WO-2015142101 A1 * | 9/2015 | ............. | H01M 4/13 |
| WO | WO-2015147122 A1 * | 10/2015 | ........ | H01M 10/0585 |
| WO | WO-2016208858 A1 * | 12/2016 | ............. | H01M 4/66 |

* cited by examiner

10

10

METHOD FOR PRODUCING SECONDARY BATTERY HAVING NEGATIVE ELECTRODE WITH DIFFERENT SURFACE ROUGHNESSES

CROSS REFERENCE TO RELATED APPLICATIONS

The present invention application claims priority to Japanese Patent Application No. 2017-063442 filed in the Japan Patent Office on Mar. 28, 2017, the entire contents of which are incorporated herein by reference.

BACKGROUND OF THE INVENTION

Field of the Invention

The present disclosure relates to a method for producing a secondary battery.

Description of Related Art

An example of a secondary battery such a non-aqueous electrolyte secondary battery in the related art is described in Japanese Published Unexamined Patent Application No. 2012-33334 (Patent Document 1). Such a secondary battery has a flat wound electrode body in which a positive electrode plate and a negative electrode plate are wound with a separator interposed therebetween. In the positive electrode plate, a positive electrode active material layer is provided on each surface of a strip-shaped positive electrode core, and a positive electrode core-exposed portion where the positive electrode core is exposed as a strip shape is provided at one end portion of each surface in the width direction. In the negative electrode plate, a negative electrode active material layer is provided on each surface of a strip-shaped negative electrode core, and a negative electrode core-exposed portion where the negative electrode core is exposed as a strip shape is provided at the other end portion of each surface in the width direction. The positive electrode active material layer and the negative electrode active material layer can each intercalate and deintercalate lithium ions.

The secondary battery further includes a positive electrode current collector electrically connected to the positive electrode core-exposed portion, a negative electrode current collector electrically connected to the negative electrode core-exposed portion, an electrolyte, and a prismatic outer body. The electrode body is inserted into the prismatic outer body such that the positive electrode core-exposed portion and the negative electrode core-exposed portion are located at different end portions of the prismatic outer body in the width direction. The electrolyte is enclosed in the prismatic outer body.

The positive electrode current collector is electrically connected to a positive electrode terminal, and the negative electrode current collector is electrically connected to a negative electrode terminal.

BRIEF SUMMARY OF THE INVENTION

The front and back surfaces of inexpensive negative electrode cores made of a copper foil or a copper alloy foil may have significantly different surface roughnesses. During development, the inventors of the present disclosure revealed that, when a negative electrode current collector is resistance-welded to a negative electrode core having front and back surfaces each with a surface roughness different from the other, the rough surface of the negative electrode core and the smooth surface of the negative electrode core differ from each other in terms of the state of contact between the resistance-welding electrode and the negative electrode core and also differ from each other in terms of suitable welding conditions. Under the welding conditions suitable for the smooth surface of the negative electrode core, preferable welding cannot be performed by using the rough surface of the negative electrode core as a welding surface, and consequently, the yield may be low. Under the welding conditions suitable for the rough surface of the negative electrode core, preferable welding cannot be performed by using the smooth surface of the negative electrode core as a welding surface, and consequently, the yield may be low.

The present disclosure is directed to a method for producing a secondary battery by which a quality secondary battery can be produced even when using a negative electrode core having front and back surfaces each with a surface roughness different from the other.

A method for producing a secondary battery according an embodiment of to the present disclosure is a method for producing a secondary battery including a flat wound electrode body in which a positive electrode plate and a negative electrode plate are wound with a separator interposed therebetween. The negative electrode plate includes a negative electrode core made of a copper foil or a copper alloy foil and a negative electrode active material mixture layer on each surface of the negative electrode core. The negative electrode core has front and back surfaces each with a surface roughness different from the other. The negative electrode core has a mixture layer-formed region where the negative electrode active material mixture layer is formed on each surface, and a negative electrode core-exposed portion where the negative electrode active material mixture layer is formed on neither of the surfaces. The negative electrode core-exposed portion is wound at one end portion of the wound electrode body in the winding axis direction. A current collector is connected by welding to the outer surface of the wound negative electrode core-exposed portion. The method for producing the secondary battery includes a step of forming the wound negative electrode core-exposed portion at one end portion in the winding axis direction to prepare the wound electrode body such that the surface roughness of the negative electrode core-exposed portion on the outer surface side is lower than the surface roughness on the inner surface side in the wound negative electrode core-exposed portion; and a step of placing the current collector on the outer surface of the wound negative electrode core-exposed portion and resistance-welding the current collector to the wound negative electrode core-exposed portion.

A method for producing a secondary battery according an embodiment of to the present disclosure is a method for producing a secondary battery including a flat wound electrode body in which a positive electrode plate and a negative electrode plate are wound with a separator interposed therebetween. The negative electrode plate includes a negative electrode core made of a copper foil or a copper alloy foil and a negative electrode active material mixture layer on each surface of the negative electrode core. The negative electrode core has front and back surfaces each with a surface roughness different from the other. The negative electrode core has a mixture layer-formed region where the negative electrode active material mixture layer is formed on each surface, and a negative electrode core-exposed portion where the negative electrode active material mixture layer is formed on neither of the surfaces. The negative electrode core-exposed portion is wound at one end portion of the wound electrode body in the winding axis direction. A current collector is resistance-welded to the outer surface of the wound negative electrode core-exposed portion. The method for producing the secondary battery includes: a mixture layer forming step of forming negative electrode active material mixture layers in a plurality of rows extending in the longitudinal direction of a negative electrode core made of a copper foil or copper alloy foil such that portions serving as the mixture layer-formed regions and portions serving as the negative electrode core-exposed portions are alternately arranged on the negative electrode core in the width direction of the negative electrode core; a cutting step of cutting the negative electrode core, which has the negative electrode active material mixture layers thereon, in the longitudinal direction of the negative electrode core to produce a plurality of negative electrode cores each having the negative electrode active material mixture layers such that portions serving as the negative electrode core-exposed portions are located at an end portion on the same side in the width direction after cutting; and a rolling-up step of rolling up the plurality of negative electrode cores in the same direction while the portions serving as the negative electrode core-exposed portions are located at an end portion on the same side in the width direction.

By the methods for producing a secondary battery according to the present disclosure, a quality secondary battery can be produced even when using a negative electrode core having front and back surfaces each with a surface roughness different from the other.

DETAILED DESCRIPTION OF THE INVENTION

Figure 1A:
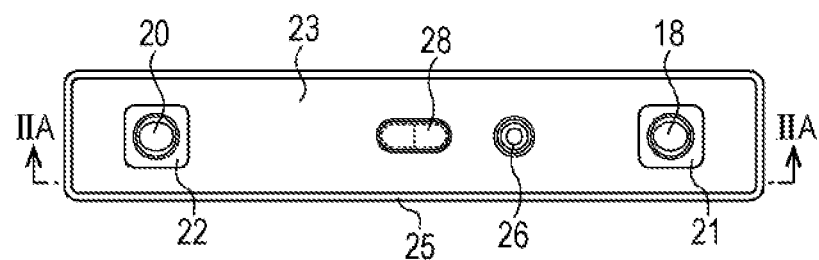
FIG. 1A is a plan view of a prismatic secondary battery that can be produced by the method of the present disclosure.

Embodiments according the present disclosure will be described below in detail with reference to the accompanying drawings. The following embodiments are illustrated for understanding the technical idea of the present disclosure. It is not intended to limit the present disclosure to these embodiments. For example, it has already been presumed that the features of the embodiments or modifications described below are appropriately combined to construct new embodiments. The present disclosure can also be equally applied to various modifications without departing from the technical idea described in the claims.

Referring first to FIG. 1A to FIG. 4, a production method according to an embodiment of the present disclosure and the schematic configuration of a prismatic secondary battery 10 that can be produced by the production method will be described below. The prismatic secondary battery 10 is an example secondary battery. As illustrated in FIG. 1A, FIG. 1B, FIG. 2, and FIG. 4, the prismatic secondary battery 10 includes a prismatic outer body (prismatic outer can) 25, a sealing plate 23, and a flat wound electrode body 14. The prismatic outer body 25 is made of for example, an aluminum foil or an aluminum alloy and has an opening on one side in the height direction. As illustrated in FIG. 1B, the prismatic outer body 25 has a bottom 40, a pair of first side surfaces 41, and a pair of second side surfaces 42. The pair of second side surfaces 42 is larger than the pair of first side surfaces 41. The sealing plate 23 is fitted into the opening of the prismatic outer body 25, and the sealing plate 23 and the prismatic outer body 25 are joined together at the fitting portion therebetween to form a prismatic battery case 45. The wound electrode body 14 is enclosed in the battery case 45.

Figure 3A:
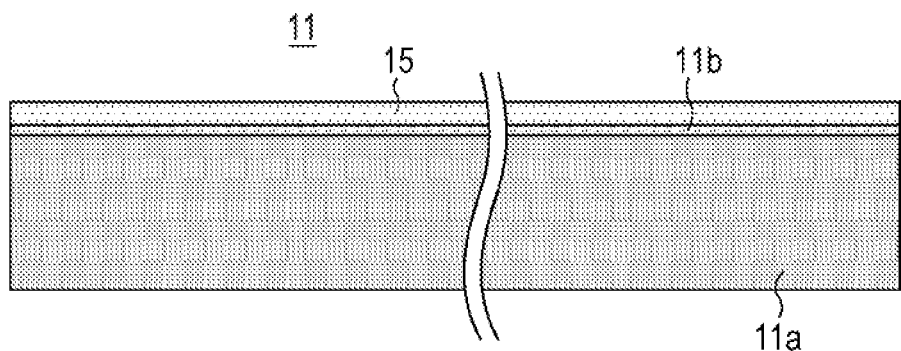
FIG. 3A is a plan view of a positive electrode plate in the prismatic secondary battery.
Figure 4:
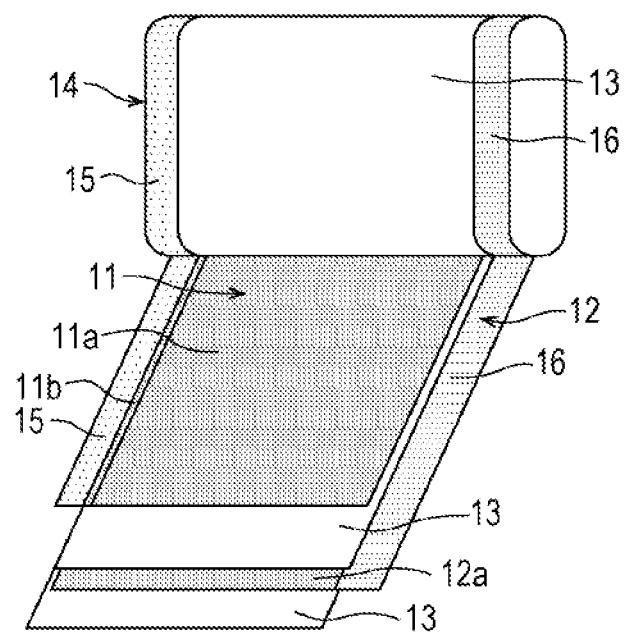
FIG. 4 is a developed perspective view of a flat wound electrode body on the winding end side in the prismatic secondary battery.

As illustrated in FIG. 4, the wound electrode body 14 has a structure in which a positive electrode plate 11 and a negative electrode plate 12 are insulated from each other by a separator 13. The wound electrode body 14 has the separator 13 on the outermost surface side. The negative electrode plate 12 is located circumferentially outward of the positive electrode plate 11. As illustrated in FIG. 3A, the positive electrode plate 11 is prepared by applying a positive electrode mixture slurry to both sides of a positive electrode core made of an aluminum or aluminum alloy foil about 10 to 20 μm in thickness, followed by drying and rolling, and cutting the obtained product in a strip shape of a predetermined size. Each cut positive electrode plate is then rolled up around a hoop. In this process, a positive electrode core-exposed portion 15 in which the positive electrode mixture layer 11a is formed on neither of the surfaces in the longitudinal direction is formed at one end portion in the width direction. For example, a positive electrode protective layer 11b is preferably formed on at least one surface of the positive electrode core-exposed portion 15 in the longitudinal direction of the positive electrode core-exposed portion 15 so as to adjoin the positive electrode mixture layer 11a. The positive electrode protective layer 11b contains insulative inorganic particles and a binder. This positive electrode protective layer 11b has lower conductivity than the positive electrode mixture layer 11a. The formation of the positive electrode protective layer 11b can suppress a short circuit, which may be caused by foreign matters or the like, between the negative electrode mixture layer 12a and the positive electrode core. The positive electrode protective layer 11b can contain conductive inorganic particles. These conductive inorganic particles allow a small internal short-circuit current to continue to flow even if a short circuit is caused between the positive electrode protective layer 11b and the negative electrode mixture layer 12a, which results in the prismatic secondary battery 10 in safe conditions. The conductivity of the positive electrode protective layer 11b can be controlled by the mixing ratio of the conductive inorganic particles to the insulative inorganic particles. The positive electrode protective layer 11b is not necessarily formed.

Figure 3B:
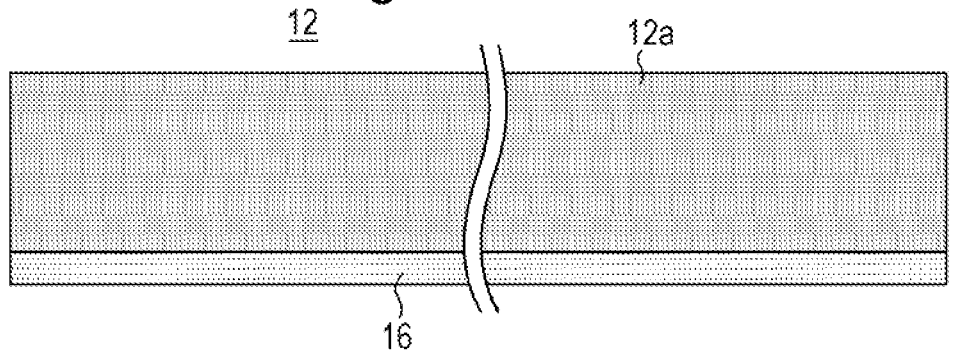
FIG. 3B is a plan view of a negative electrode plate in the prismatic secondary battery.

As illustrated in FIG. 3B, the negative electrode plate 12 is prepared by applying a negative electrode mixture slurry to both sides of a negative electrode core, followed by drying and rolling, and cutting the obtained product in a strip shape of a predetermined size. Each cut negative electrode plate is then rolled up around a hoop. In this process, a negative electrode core-exposed portion 16 in which the negative electrode mixture layer 12a is formed on neither of the surfaces in the longitudinal direction is formed. The positive electrode core-exposed portion 15 may be formed at both end portions in the width direction of the positive electrode plate 11. The negative electrode core-exposed portion 16 may be formed at both end portions in the width direction of the negative electrode plate 12.

More specifically, the negative electrode plate 12 is produced in the following manner. A negative electrode mixture slurry in a paste form is prepared by mixing a negative electrode active material with a conductive agent, a binder, and other materials and kneading the obtained mixture in a dispersion medium. Subsequently, the negative electrode mixture slurry is applied to both sides of a long negative electrode core. The negative electrode core is a copper foil or a copper alloy foil about 5 to 15 μm in thickness. One surface of the copper foil or copper alloy foil differs from the other surface in terms of surface roughness Rz (ten-point mean roughness). The surface roughness Rz of the smooth surface is less than 1.0 μm according to the measurement with a laser-type surface-measuring machine, whereas the surface roughness Rz of the rough surface is more than 1.0 μm according to the measurement with a laser-type surface measuring machine. The surface roughness Rz of the smooth surface is preferably 0.8 μm or less, more preferably 0.6 μm or less, and still more preferably 0.5 μm or less. The value obtained by subtracting the surface roughness Rz of the smooth surface from the surface roughness Rz of the rough surface is preferably 0.4 μm or more, more preferably 0.6 μm or more, and still more preferably 0.8 μm or more.

The application of the negative electrode mixture slimy to both sides of the long negative electrode core is carried out in the following manner. Specifically, referring to FIG. 5, a long negative electrode core 50 before cutting is disposed below an ejection unit (not shown). The ejection unit is positioned above the negative electrode core 50 and extends in the width direction of the negative electrode core 50 (direction X in FIG. 5). Four ejection nozzles are arranged at regular intervals in direction X below the ejection unit (on the negative electrode core 50 side). In this state, the negative electrode core 50 is conveyed at a constant speed toward one side in the longitudinal direction (winding direction), which is indicated by arrow Y, by unwinding the negative electrode core 50 with a drive roller (not shown), so that the negative electrode core 50 travels in the longitudinal direction below the ejection unit at a constant speed with respect to the ejection unit. In this state, the negative electrode mixture slurry is applied to the negative electrode core 50 by continuously ejecting the negative electrode mixture slurry toward the negative electrode core 50 from four ejection nozzles arranged at regular intervals in direction X. The negative electrode mixture slurry is applied to one surface of the negative electrode core 50 accordingly and the negative electrode mixture slurry is dried. Subsequently, the negative electrode core 50 is turned upside down, and the negative electrode mixture slurry is applied to the other surface of the negative electrode core 50 similarly. The applied negative electrode mixture shiny is then dried.

The obtained films are then compressed to form negative electrode active material layers on the negative electrode core 50.

Since four ejection nozzles are arranged at regular intervals in direction X below the ejection unit, portions 50a serving as mixture layer-formed regions and portions 50b serving as negative electrode core-exposed portions are disposed on the long negative electrode core 50 before cutting and alternately arranged in the width direction of the negative electrode core 50 (direction X). After the application, four rows of portions 50a serving as mixture layer-formed regions are formed so as to extend in the longitudinal direction of the negative electrode core (a copper foil before cutting) 50 (direction Y). Subsequently, both sides of the negative electrode core are dried, followed by rolling to form four sets of alternating mixture layer-formed regions and negative electrode core-exposed portions on both sides of the negative electrode core before cutting. The negative electrode core is then cut in the longitudinal direction (winding direction) so as to form four sets of negative electrode cores for use in batteries while the negative electrode core-exposed portions are located on one end portion in the width direction. In the example illustrated in FIG. 5, the negative electrode core is cut along straight lines a1 to a5 extending in the longitudinal direction (winding direction). The obtained cut negative electrode cores are wound around their respective hoops while the negative electrode core-exposed portions are located on the same side in the width direction. In the example illustrated in FIG. 5, a set of the mixture layer-formed region and the negative electrode core-exposed portion is periodically repeated at regular intervals, and thus the cut negative electrode cores are wound around the respective hoops in the same direction simply as they are. All of four long cut negative electrode cores are wound around the respective hoops while the smooth surface is located on the same side (the outer circumferential side or the inner circumferential side).

Subsequently, as illustrated in FIG. 4, the positive electrode plate 11 and the negative electrode plate 12 are displaced from each other in the width direction of the wound electrode body 14 (in the width direction of the positive electrode plate 11 and the negative electrode plate 12) with respective to the opposite electrode mixture layers 11a and 12a such that the positive electrode core-exposed portion 15 and the negative electrode core-exposed portion 16 do not overlap with their corresponding opposite electrode mixture layers 12a and 11a. The positive electrode plate 11 and the negative electrode plate 12 are wound in a flat form while they are insulated from each other with a separator 13 interposed therebetween, producing a flat wound electrode body 14. The wound electrode body 14 includes a multi-layered positive electrode core-exposed portion 15 at one end portion in the direction in which the winding axis extends (corresponding to the width direction of the strip-shaped positive electrode plate 11, the strip-shaped negative electrode plate 12, and the strip-shaped separator 13 when developed in a rectangular shape). The wound electrode body 14 includes a multi-layered negative electrode core-exposed portion 16 at the other end portion.

In winding to form the wound electrode body 14, the smooth surfaces of the negative electrode cores with a low surface roughness Rz are placed on the outer circumferential side in the wound electrode body 14 by unwinding the negative electrode cores for the negative electrode plate 12 from all the respective hoops by the same method. Since the negative electrode cores are wound around their respective hoops such that the smooth surfaces are located on the same side (the outer circumferential side or the inner circumferential side) in all the hoops as described above, the smooth surface side can easily be located on the outer circumferential side of the wound electrode body 14 only by unwinding the negative electrode cores from all the respective hoops by the same method.

The separator 13 is preferably a polyolefin microporous membrane. The width of the separator 13 is preferably large enough to cover the positive electrode mixture layer 11a and the positive electrode protective layer 11b and larger than the width of the negative electrode mixture layer 12a. As described below, the multi-layered positive electrode core-exposed portion 15 is electrically connected to a positive electrode terminal 18 via a positive electrode current collector 17 (see FIG. 2A). The multi-layered negative electrode core-exposed portion 16 is electrically connected to a negative electrode terminal 20 via a negative electrode current collector 19 (see FIG. 2A). Since the smooth surface is located on the outer circumferential side in the negative electrode plate 12 of the wound electrode body 14 in this embodiment, the negative electrode current collector 19 (see FIG. 2A) is resistance-welded to the negative electrode core-exposed portion 16 having the smooth surface during resistance welding. Therefore, welding can be performed appropriately on all the wound electrode bodies 14 to improve the yield only by setting conditions suitable for welding on the smooth surface in all the wound electrode bodies 14 even though the front and back surfaces of the negative electrode core have different surface roughnesses Rz.

Furthermore, the smooth surface of the negative electrode core that has a low surface roughness Rz and comes into close contact with the resistance-welding electrode can be welded to the negative electrode current collector 19 even though the front and back surfaces of the negative electrode core have different surface roughnesses Rz. Therefore, resistance welding can be performed with a small amount of energy, and the joint in close contact can be further achieved, which can increase the quality of the secondary battery after joining. As a result, a quality secondary battery can be produced even though the cost for the negative electrode core material can be reduced.

The ejection unit is disposed so as to extend in the width direction of the negative electrode core material before cutting. The ejection unit has a plurality of nozzles (two or more nozzles) at regular intervals in the width direction. The negative electrode mixture slurry may be applied to the rough surface and the smooth surface simultaneously.

Next, the advantages of the production method of this embodiment will be described with reference to FIG. 6. FIG. 6 is a figure of Reference Example corresponding to FIG. 5. As illustrated in FIG. 6, in Reference Example, pairs of negative electrode core materials each including a portion 70a serving as a mixture layer-formed region and a negative electrode core-exposed portion 70b are formed, and the portion 70a and the negative electrode core-exposed portion 70b are respectively located on one side and the other side in the width direction of each negative electrode core material before cutting. One pair of the negative electrode core materials is symmetrical to the other with respect to a plane including the longitudinal direction. For Comparative Example, in two of four cut negative electrode cores after cutting along lines b1 to b5 extending in the longitudinal direction (winding direction), the negative electrode core-exposed portion 70b is located on one side in the width direction. In other two negative electrode cores, the negative electrode core-exposed portion 70b is located on the other side in the width direction. To roll up the cut negative electrode cores around their respective hoops while the negative electrode core-exposed portions 70b are located on the same side in the width direction, half of the negative electrode cores need to be rolled up around their respective hoops after being turned upside down. Due to turning upside down, the rough surface of the negative electrode plate is located on the outer circumferential side in half of the produced wound electrode bodies. Under the welding conditions suitable for the smooth surface, preferable welding cannot be performed by using the rough surface as a welding surface, and consequently, the yield may be low. Under the welding conditions suitable for the rough surface, preferable welding cannot be performed by using the smooth surface as a welding surface, and consequently, the yield may be low.

Figure 5:
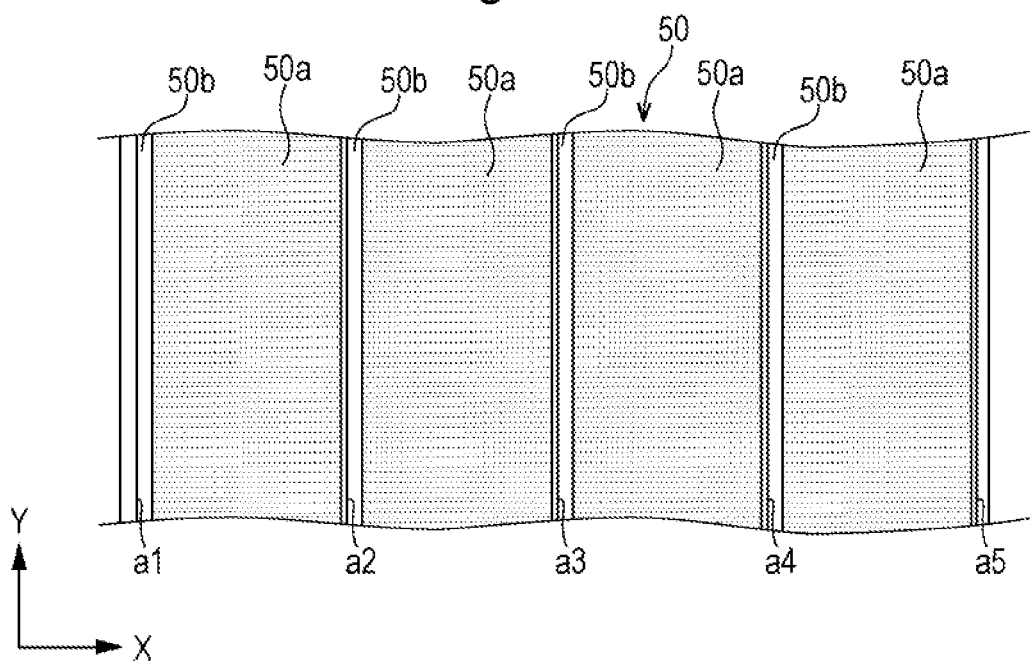
FIG. 5 is a plan view illustrating the mixture layer-formed regions in the negative electrode core of the prismatic secondary battery before cutting.
Figure 6:
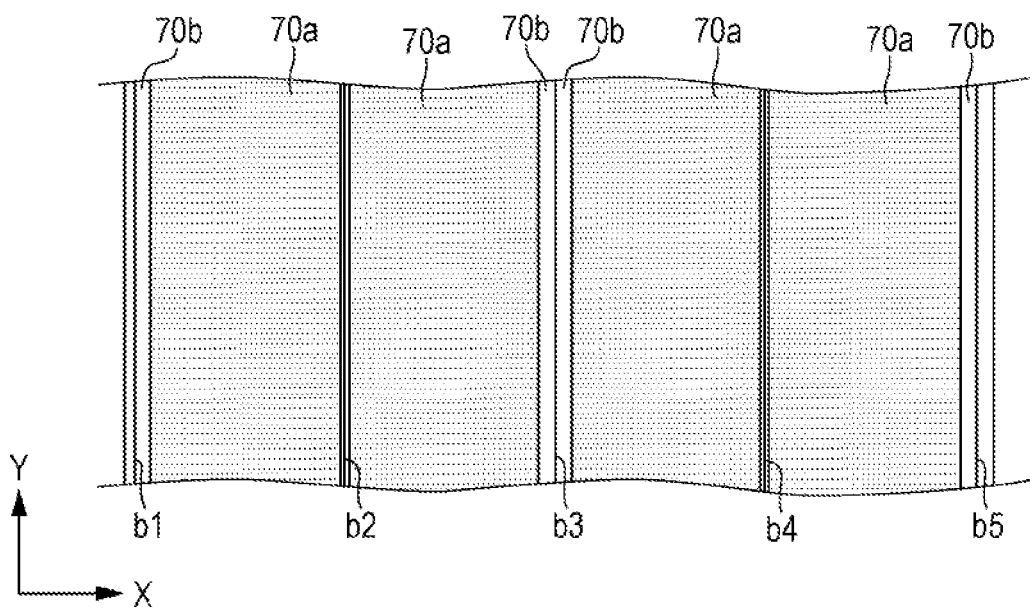
FIG. 6 is a plan view of a negative electrode core of Reference Example before cutting corresponding to FIG. 5.

In this embodiment, as illustrated in FIG. 5, the negative electrode active material mixture layers in a plurality of rows extending in the longitudinal direction of a negative electrode core made of a long copper foil or copper alloy foil are formed such that portions serving as mixture layer-formed regions and portions serving as negative electrode core-exposed portions are alternately arranged on the negative electrode core in the width direction of the negative electrode core. Therefore, only by cutting the negative electrode core at regular intervals, the portions serving as negative electrode core-exposed portions are located at one end portion on the same side in the width direction in the cut negative electrode cores. By rolling up the cut negative electrode cores around the respective hoops in the same direction as they are, the smooth surface can be located on the outer circumferential side easily and assuredly in the negative electrode plate of each of the produced wound electrode bodies. Therefore, the yield can be increased and a quality battery can be produced even when using an inexpensive negative electrode core in which the front and back surfaces of a negative electrode core material have different surface roughnesses Rz.

Figure 1B:
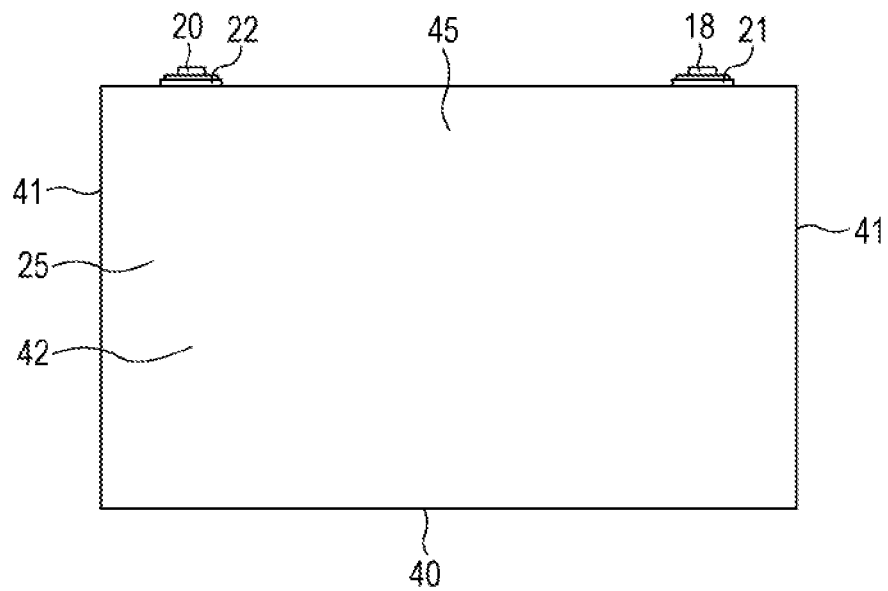
FIG. 1B is a front view of the prismatic secondary battery.
Figure 2C:
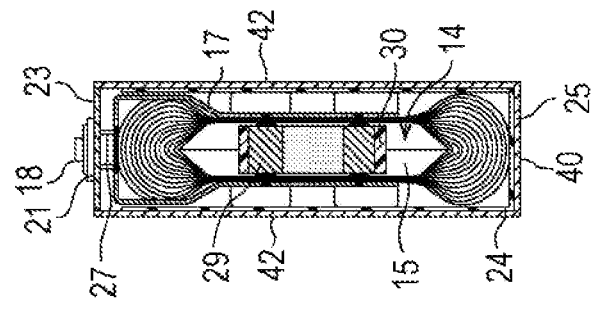
FIG. 2C is a sectional view taken along line IIC-IIC in FIG. 2A.
Figure 2A:
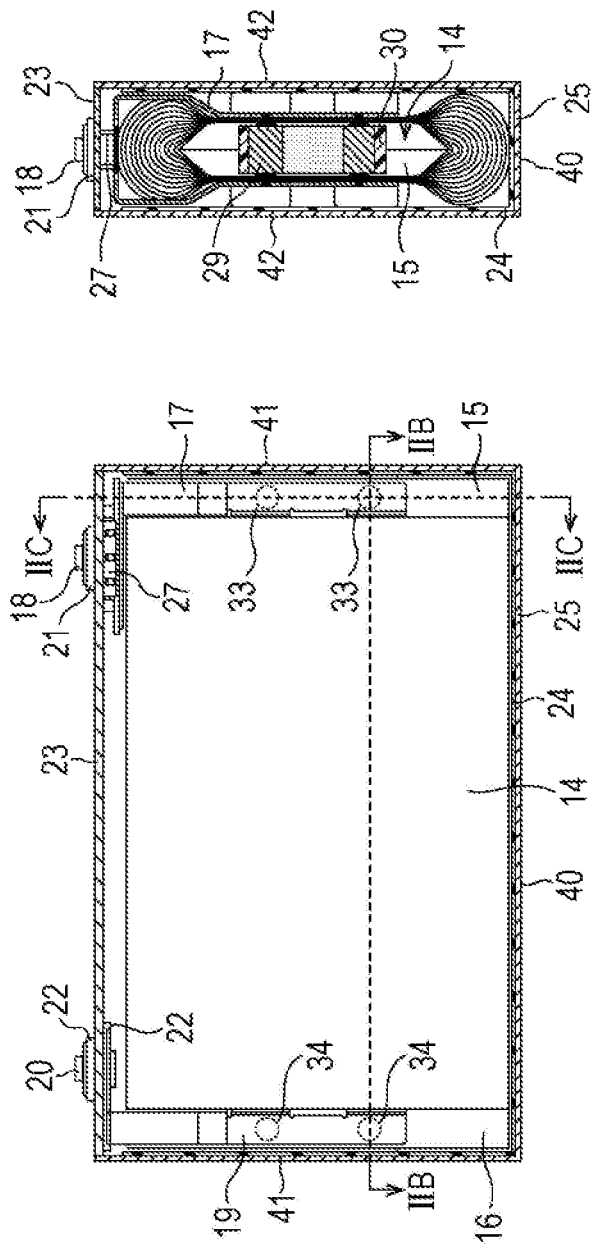
FIG. 2A is a partial sectional view taken along line IIA-IIA in FIG. 1A.

Reference is made again to FIG. 2A. A current interrupting mechanism 27 is preferably provided between the positive electrode current collector 17 and the positive electrode terminal 18. The current interrupting mechanism 27 operates at a time when the gas pressure in the battery case 45 reaches a predetermined value or higher. As illustrated in FIG. 1A, FIG. 1B, and FIG. 2A, the positive electrode terminal 18 is fixed to the sealing plate 23 with an insulating member 21 interposed therebetween, and the negative electrode terminal 20 is fixed to the sealing plate 23 with an insulating member 22 interposed therebetween. The sealing plate 23 has a gas release valve 28, which opens at a time when the gas pressure in the battery case 45 is higher than the operating pressure of the current interrupting mechanism 27. The positive electrode current collector 17, the positive electrode terminal 18, and the sealing plate 23 are each formed of aluminum or an aluminum alloy. The negative electrode current collector 19 and the negative electrode terminal 20 are each formed of copper or a copper alloy. As illustrated in FIG. 2C, the flat wound electrode body 14 is inserted into the prismatic outer body 25 whose one surface is open while an insulative sheet (resin sheet) 24 is placed between the prismatic outer body 25 and the surrounding areas of the flat wound electrode body 14 except for the area on the sealing plate 23 side.

Figure 2B:
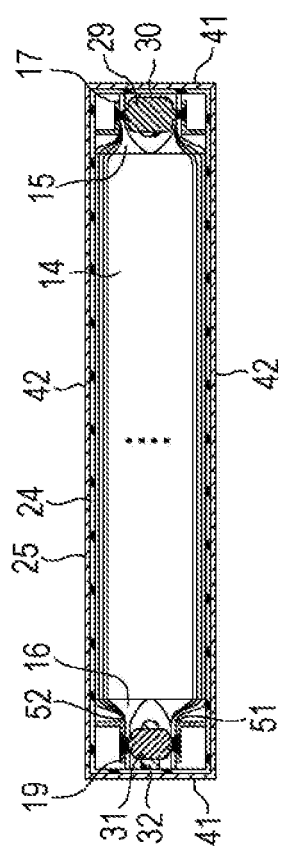
FIG. 2B is a partial sectional view taken along line IIB-IIB in FIG. 2A.

As illustrated in FIG. 2B and FIG. 2C, on the positive electrode plate 11 side, a wound and multi-layered positive electrode core-exposed portion 15 is divided into two parts in the thickness direction, and a positive electrode intermediate member 30 is interposed between these two parts. The positive electrode intermediate member 30 is made of a resin material, and the positive electrode intermediate member 30 has one or more, for example, two positive electrode conductive members 29. Each positive electrode conductive member 29 has, for example, a cylindrical shape and has a truncated cone-shaped protrusion that functions as a projection on each end portion facing the layered positive electrode core-exposed portion 15.

On the negative electrode plate 12 side, a wound and multi-layered negative electrode core-exposed portion 16 is also divided into two parts in the thickness direction, and a negative electrode intermediate member 32 is interposed between these two parts. The negative electrode intermediate member 32 is made of a resin material, and the negative electrode intermediate member 32 has one or more, for example, two negative electrode conductive members 31. The negative electrode conductive member 31 has, for example, a cylindrical shape and has a truncated cone-shaped protrusion that functions as a projection on each end portion facing the layered negative electrode core-exposed portion 16. The positive electrode intermediate member 30 and the negative electrode intermediate member 32 are optional members and can be omitted. The positive electrode conductive members 29 and the negative electrode conductive members 31 are optional members and can be omitted.

Each positive electrode conductive member 29 is electrically connected by resistance welding to the converged parts of the positive electrode core-exposed portion 15 on both sides of the positive electrode conductive member 29 in the direction in which the positive electrode conductive member 29 extends. The converged parts of the positive electrode core-exposed portion 15 are electrically connected by resistance welding to the positive electrode current collector 17 located on the outer side in the depth direction of the battery case 45. Similarly, each negative electrode conductive member 31 is electrically connected by resistance welding to the converged parts of the negative electrode core-exposed portion 16 on both sides of the negative electrode conductive member 31. The converged parts of the negative electrode core-exposed portion 16 are electrically connected by resistance welding to the negative electrode current collector 19 located on the outer side in the depth direction of the battery case 45. One end of the positive electrode current collector 17 opposite to the other end on the positive electrode core-exposed portion 15 side is electrically connected to the positive electrode terminal 18. One end of the negative electrode current collector 19 opposite to the other end on the negative electrode core-exposed portion 16 side is electrically connected to the negative electrode terminal 20. As a result, the positive electrode core-exposed portion 15 is electrically connected to the positive electrode terminal 18, and the negative electrode core-exposed portion 16 is electrically connected to the negative electrode terminal 20.

The wound electrode body 14, the positive electrode and negative electrode intermediate members 30 and 32, and the positive electrode and negative electrode conductive members 29 and 31 are connected to each other by resistance welding to form an integral structure. The positive electrode conductive members 29 are preferably made of aluminum or an aluminum alloy, which is the same material as that for the positive electrode core. The negative electrode conductive members 31 are preferably made of copper or a copper alloy, which is the same material as that for the negative electrode core.

Next, resistance welding on the negative electrode side will be described below in more detail with reference to FIG. 7. The description of resistance welding on the positive electrode side performed in the same manner as for that on the negative-electrode side is omitted.

Figure 7:
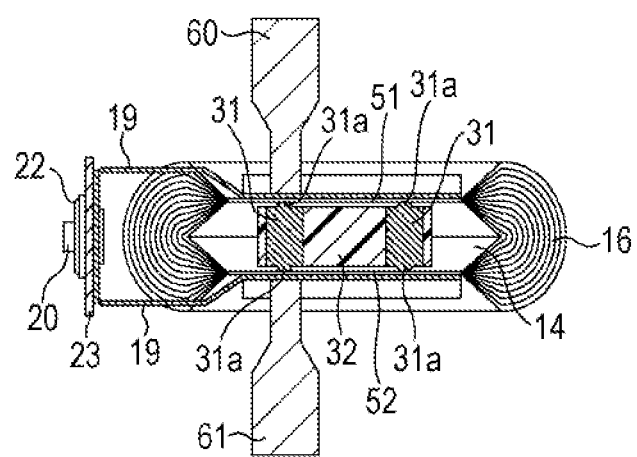
FIG. 7 is a view for describing resistance welding on the negative electrode side.

As illustrated in FIG. 7, a layered negative electrode core-exposed portion 16 is divided into two parts in the layering direction: a first layered negative electrode core-exposed portion 51 and a second layered negative electrode core-exposed portion 52. Negative electrode conductive members 31 retained by a negative electrode intermediate member 32 are disposed between the first layered negative electrode core-exposed portion 51 and the second layered negative electrode core-exposed portion 52. Projections 31a formed on the respective end portions of each negative electrode conductive member 31 are brought into contact with the first layered negative electrode core-exposed portion 51 and the second layered negative electrode core-exposed portion 52, respectively. The negative electrode current collector 19 is disposed on the outer surface side of the first layered negative electrode core-exposed portion 51 and the outer surface side of the second layered negative electrode core-exposed portion 52. Next, a resistance-welding electrode 60 and a resistance-welding electrode 61 are brought into contact with the negative electrode current collector 19, respectively. The negative electrode current collector 19, the first layered negative electrode core-exposed portion 51, the negative electrode conductive member 31, the second layered negative electrode core-exposed portion 52, the negative electrode current collector 19 are thus sandwiched in this order between the resistance-welding electrode 60 and the resistance-welding electrode 61. In this state, a voltage is applied across the resistance-welding electrode 60 and the resistance-welding electrode 61. This process causes a resistance welding current to flow between the resistance-welding electrode 60 and the resistance-welding electrode 61. As a result, the negative electrode current collector 19 is welded to the negative electrode core-exposed portion 16, and each negative electrode conductive member 31 is welded to the negative electrode core-exposed portion 16. When two negative electrode conductive members 31 are used, welding may be performed at two points simultaneously by the above-described method using two sets of the resistance-welding electrode 60 and the resistance-welding electrode 61. Alternatively, welding at two points may be performed separately.

When the positive electrode core-exposed portion 15 or the negative electrode core-exposed portion 16 is divided into two parts, a welding current needed to form welding marks that penetrate through the multi-layered positive electrode core-exposed portion 15 or the multi-layered negative electrode core-exposed portion 16 is smaller than that in a case where the positive electrode core-exposed portion 15 or the negative electrode core-exposed portion 16 is not divided into two parts. Therefore, occurrence of sputtering during resistance welding is reduced, which suppresses generation of troubles, such as an internal short circuit of the flat wound electrode body 14 due to sputtering. FIG. 2A illustrates welding marks 33 at two points on the positive electrode current collector 17 formed by resistance welding and also illustrates welding marks 34 at two points on the negative electrode current collector 19. In resistance welding, the positive electrode conductive members 29 and the negative electrode conductive members 31 may have the same shape or different shapes. The positive electrode intermediate member 30 and the negative electrode intermediate member 32 are not necessarily used.

Reference is made again to FIG. 1A. The sealing plate 23 has an electrolyte injection port 26. The wound electrode body 14 including the positive electrode current collector 17, the negative electrode current collector 19, the sealing plate 23, and other components is placed in the prismatic outer body 25. In this process, the wound electrode body 14 is preferably inserted into the prismatic outer body 25 while the wound electrode body 14 is placed in an insulative sheet 24 formed in a box shape or a bag shape. Subsequently, the sealing plate 23 and the prismatic outer body 25 are laser-welded together at the fitting portion therebetween, and a non-aqueous electrolyte is then injected through the electrolyte injection port 26. The electrolyte injection port 26 is then sealed to produce a prismatic secondary battery 10. Sealing of the electrolyte injection port 26 is performed by, for example, blind riveting or welding.

The prismatic secondary battery 10 is used singly or used in combination of two or more in series connection, in parallel connection, or in series and parallel connection in various applications. In the combinational use of two or more prismatic secondary batteries 10 in series connection or in parallel connection in vehicle applications or other applications, positive electrode external terminals and negative electrode external terminals are provided separately and used to connect the batteries via bus bars.

The case where the winding axis of the wound electrode body 14 is parallel to the bottom 40 of the prismatic outer body 25 is described above. The winding axis of the wound electrode body 14 may be perpendicular to the bottom 40 of the prismatic outer body 25. Any compound that can reversibly intercalate and deintercalate lithium ions can be appropriately selected and used as a positive electrode active material in a prismatic secondary battery that can be produced by the method of the present disclosure.

Examples of suitable positive electrode active materials include lithium-transition metal composite oxides. For example, lithium-transition metal composite oxides represented by $LiMO_2$ (where M represents at least one of Co, Ni, and Mn), which can reversibly intercalate and deintercalate lithium ions, such as $LiCoO_2$, $LiNiO_2$, $LiNi_yCo_{1-y}O_2$ (y=0.01 to 0.99), $LiMnO_2$, and $LiCo_xMn_yNi_zO_2$ (x+y+z=1), and lithium-transition metal composite oxides represented by $LiMn_2O_4$ and $LiFePO_4$ can be used singly or as a mixture of two or more. Furthermore, lithium-cobalt composite oxides having an additional different metal element, such as zirconium, magnesium, aluminum, or tungsten, can also be used.

The solvent for the non-aqueous electrolyte is not limited, and a known solvent that has commonly been used in non-aqueous electrolyte secondary batteries can be used.

Examples of such solvents include cyclic carbonates, such as ethylene carbonate (EC), propylene carbonate (PC), butylene carbonate, and vinylene carbonate (VC); linear carbonates, such as dimethyl carbonate (DMC), methyl ethyl carbonate (MEC), and diethyl carbonate (DEC); ester-containing compounds, such as methyl acetate, ethyl acetate, propyl acetate, methyl propionate, ethyl propionate, and γ-butyrolactone; and sulfone group-containing compounds, such as propanesultone. These solvents may be used singly or used in combination of two or more. In particular, a solvent containing a cyclic carbonate and a linear carbonate in combination is preferred.

A known lithium salt that has commonly been used in non-aqueous electrolyte secondary batteries can be used as a solute for the non-aqueous electrolyte. Specific examples of solutes include lithium salts, such as $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, $LiAsF_6$, $LiClO_4$, $LiPF_2O_2$, and mixtures thereof. In particular, $LiPF_6$ is preferably used in order to improve the high-rate charge/discharge characteristics and durability of the non-aqueous electrolyte secondary battery.

These solutes may be used singly or as a mixture of two or more. The concentration of the solute is preferably, but not necessarily, 0.8 to 1.7 mol per liter of the non-aqueous electrolyte.

In a non-aqueous electrolyte secondary battery according to one aspect of the present disclosure, the negative electrode active material used for the negative electrode is any material that can reversibly intercalate and deintercalate lithium. Examples of the negative electrode active material include carbon materials, silicon materials, a lithium metal, metals and alloy materials to be alloyed with lithium, and metal oxides. Carbon materials are preferably used as a negative electrode active material from the viewpoint of material cost. Examples of carbon materials include natural graphite, artificial graphite, mesophase pitch-based carbon fiber (MCF), mesocarbon microbeads (MCMB), corks, and hard carbon. To improve the high-rate charge/discharge characteristics, a carbon material produced by coating a graphite material with low crystalline carbon is preferably used as the negative electrode active material.

A known separator that has commonly used in non-aqueous electrolyte secondary batteries can be used as a separator. For example, a separator made of polyolefin is preferred. Specifically, not only a separator made of polyolefin but also a separator having a polypropylene layer on a polyethylene surface may be used. A layer containing an inorganic filler used in the related art can be formed in the interface between the positive electrode and the separator or in the interface between the negative electrode and the separator.

Examples of the present disclosure will be described below in detail with reference to Table 1. Table 1 shows the number of non-defective products and defective products with respect to the total number of test samples, the details of welding defects, and the yield when prismatic secondary batteries are produced by using different materials for the negative electrode core under different welding conditions. The present disclosure is not limited to Examples.

TABLE 1

| | Welding Conditions | | | | | Welding Surface of Copper Foil | | Test Results | | | | |
| --- | --- | --- | --- | --- | --- | --- | --- | --- | --- | --- | --- | --- |
| | Diameter of Resistance-Welding Electrode (mm) | Pressure (N) | Current (kA) | Time (ms) | Slope (ms) | Smooth Surface/Rough Surface | Surface Roughness (Rz) | Number of Sample | Non-Defective Products | Defects | | Yield (%) |
| | | | | | | | | | | Joint Failure | Explosion | |
| Example | 3.5 | 1100 | 26 | 7 | 3 | smooth surface | 0.49 | 1221 | 1218 | 2 | 1 | 99.75 |
| Comparative Example 1 | 3.5 | 1100 | 26 | 7 | 3 | rough surface | 1.37 | 1119 | 1097 | 19 | 3 | 98.03 |

TABLE 1-continued

| | Welding Conditions | | | | | Welding Surface of Copper Foil | | Test Results | | | | |
|---|---|---|---|---|---|---|---|---|---|---|---|---|
| | Diameter of Resistance-Welding Electrode (mm) | Pressure (N) | Current (kA) | Time (ms) | Up Slope (ms) | Smooth Surface/Rough Surface | Surface Roughness (Rz) | Number of Sample | Non-Defective Products | Defects Joint Failure | Explosion | Yield (%) |
| Comparative Example 2 | 3.5 | 1100 | 28 | 7 | 3 | rough surface | 1.37 | 1372 | 1357 | 1 | 14 | 98.91 |
| Comparative Example 3 | 3.5 | 1100 | 28 | 7 | 3 | mixed | 0.49/1.37 | 1246 | 1228 | 2 | 16 | 98.56 |

Production of Prismatic Secondary Batteries of Example and Comparative Examples

Production of Prismatic Secondary Battery of Example

Resistance welding was performed on the negative electrode side in a wound electrode body in the following manner. Specifically, a copper foil having front and back surfaces each with a surface roughness different from the other was used as a negative electrode core. More specifically, a copper foil having a smooth surface with a surface roughness of 0.49 μm and a rough surface with a surface roughness of 1.37 μm was used. A negative electrode current collector was resistance-welded to the smooth surface of the negative electrode core by the above-described method such that the smooth surface of the negative electrode core was located on the outer surface side of the wound electrode body. Subsequently, the wound electrode body to which the negative electrode current collector was connected was used to produce a prismatic secondary battery. The welding conditions were as described below. Specifically, a resistance-welding electrode 3.5 mm in diameter was used, and the pressure at which the resistance-welding electrode was pressed against the negative electrode current collector was 1100 N during welding. The current flowing through the resistance-welding electrode during energization was 26 kA, and the energization time (welding time) was 7 ms. The current was increased to 26 kA for 3 ms (Up slope: 3 ms).

Production of Prismatic Secondary Battery of Comparative Example 1

A prismatic secondary battery was produced by performing resistance welding on the negative electrode side in a wound electrode body using the same copper foil as that for the negative electrode core of Example under the same welding conditions as those in Example. A negative electrode current collector was resistance-welded to the rough surface of a negative electrode core such that the rough surface of the negative electrode core was located on the outer surface side of the wound electrode body.

Production of Prismatic Secondary Battery of Comparative Example 2

A negative electrode current collector was resistance-welded to the rough surface of a negative electrode core by using the same copper foil as that for the negative electrode core of Example such that the rough surface of the negative electrode core was located on the outer surface side of the wound electrode body. Resistance welding on the negative electrode side was performed under the same welding conditions as those in Example except that the current flowing through the resistance-welding electrode during energization was 28 kA.

Production of Prismatic Secondary Battery of Comparative Example 3

Samples in which the surface roughness Rz of the negative electrode core on the outer surface side (welding surface side) in the wound electrode body was 0.49 μm and samples in which the surface roughness Rz of the negative electrode core on the outer surface side (welding surface side) was 1.37 μm were used in combination at a ratio of 1:1. Welding was performed under the same welding conditions as those in Comparative Example 2 to produce a prismatic secondary battery. In 623 samples out of 1246 samples of Comparative Example 3, a negative electrode current collector was resistance-welded to the surface of the negative electrode core having a surface roughness Rz of 0.49 μm. In another 623 samples out of 1246 samples of Comparative Example 3, a negative electrode current collector was resistance-welded to the surface of the negative electrode core having a surface roughness Rz of 1.37 μm.

Evaluation of Prismatic Secondary Batteries

Evaluation of Yield

The number of times a favorable welded zone was formed was investigated with respect to the number of times of tests conducted for the production of the prismatic secondary batteries of Example and Comparative Examples.

Analysis of Welding Defects

The details of defects when welding defects occurred were analyzed for the production of the prismatic secondary batteries of Example and Comparative Examples. Specifically, the number of times of explosions, which is a phenomenon of melt spreading during welding due to an excessive amount of energy in welding, was investigated. In addition, the number of times of joint failures in which a joint failed due to insufficient energy during welding was investigated.

Evaluation Results of Prismatic Secondary Batteries

For the battery of Comparative Example 3, the number of times of good welds was 1228 out of a total of 1246 tests, and the number of times of welding defects was 18, giving a yield of 98.56%. The details of 18 times of welding defects included 16 times of explosions and 2 times of joint failures.

For the battery of Comparative Example 2, the number of times of good welds was 1357 out of a total of 1372 tests, and the number of times of welding defects was 15, giving a yield of 98.91%. The details of 15 times of welding defects included 14 times of explosions and 1 time of joint failure.

For the battery of Comparative Example 1, the number of times of good welds was 1097 out of a total of 1119 tests, and the number of times of welding defects was 22, giving a yield of 98.03%. The details of 22 times of welding defects included 19 times of joint failures and 3 times of explosions.

For the battery of Example, the number of times of good welds was 1218 out of a total of 1221 tests, and the number of times of welding defects was as small as 3, giving a yield of 99.75%. The details of 3 times of welding defects included 2 times of joint failures and 1 time of explosion.

Comparing Comparative Example 1 and Comparative Example 2 where the surface roughness Rz is as large as 1.37 µm, the yield can be increased from 98.03% to 98.91% by optimizing the energization current from 26 kA to 28 kA. However, it is more preferred that the current collector be welded to the smooth surface having a surface roughness Rz of 0.49 µm.

Comparing Comparative Example 2 and Comparative Example 3, the yield of Comparative Example 2 is 98.91%, whereas the yield of Comparative Example 3 is 98.56%, which is lower. Since an energization current of 28 kA is a welding condition optimized for the rough surface having a surface roughness Rz of 1.37 µm, an energization current of 28 kA is not a suitable condition for Comparative Example 3 where samples in which the surface roughness Rz of the welding surface is 0.49 µm are mixed with samples in which the surface roughness Rz of the welding surface is 1.37 µm.

A comparison is further made between Comparative Example 1 and Example where the energization current flowing through the resistance-welding electrode is as small as 26 kA. In Comparative Example 1 where the surface roughness Rz of the welding surface of the negative electrode core material is 1.37 µm, the number of times of joint failures is as large as 19. In Example where the surface roughness Rz of the welding surface of the negative electrode core material is 0.49 µm, the number of times of explosions and the number of times of joint failures are both small and the yield is 99.75%, indicating that welding defects hardly occur. Therefore, when the smooth surface having a surface roughness Rz of 0.5 µm or less is formed and resistance welding is performed on the smooth surface, stable welding can be carried out with a small welding current, and the quality of the battery after welding can also be improved. The reasons for this are supposed to be as described below. Specifically, the area of contact between the resistance-welding electrode and the negative electrode core material is large for the smooth surface having a surface roughness Rz of 0.5 µm or less. There is thus a small risk of joint failures even when the welding current is reduced to substantially prevent occurrence of explosions. Therefore, stable welding can be carried out with a small welding current, and the quality of the battery after welding can also be improved.

As described above, according to the secondary battery of the present disclosure, the wound electrode body 14 is produced by forming the wound negative electrode core-exposed portion 16 at one end portion in the winding axis direction such that the surface roughness of the negative electrode core-exposed portion 16 on the outer surface side is lower than the surface roughness on the inner surface side in the wound electrode body 14. The negative electrode current collector 19 is placed on the outer surface of the wound negative electrode core-exposed portion, and the negative electrode current collector 19 is resistance-welded to the wound negative electrode core-exposed portion 16. Therefore, a favorable welded zone can be formed with a small amount of energy even when using an inexpensive negative electrode core material because the surface having a low surface roughness selectively undergoes resistance welding. As a result, the production costs can be reduced and, moreover, a quality secondary battery can be produced.

The ten-point mean roughness Rz of the welding surface of the negative electrode core-exposed portion 16 may be 0.5 µm or less. In this case, stable welding can be carried out with a small welding current, and a very high yield of 99.5% or higher can also be achieved.

The value obtained by subtracting the ten-point mean roughness Rz of the smooth surface, which is a welding surface, from the ten-point mean roughness Rz of the rough surface of the negative electrode core may be 0.8 µm or more. In this case, the material cost for the negative electrode core material can be reduced significantly, and the production costs can be reduced significantly even though the quality is high.

In addition, as illustrated in FIG. 5, negative electrode active material mixture layers in a plurality of rows extending in the longitudinal direction of a negative electrode core made of a long copper foil or copper alloy foil are preferably formed such that portions serving as mixture layer-formed regions and portions serving as negative electrode core-exposed portions are alternately arranged on the negative electrode core in the width direction of the negative electrode core. In this case, only by cutting the negative electrode core at regular intervals, the portions serving as negative electrode core-exposed portions are located at one end portion on the same side in the width direction in the cut negative electrode cores. By rolling up the cut negative electrode cores around the respective hoops in the same direction, the smooth surfaces can be located on the outer circumferential side easily and assuredly in the negative electrode plate 12 of all the produced wound electrode bodies 14. Therefore, the yield can be increased and a quality battery can be produced because resistance welding can be performed selectively on the smooth surface easily and assuredly even when using an inexpensive negative electrode core in which the front and back surfaces of a negative electrode core material have different Rz.

The present disclosure is not limited to the embodiments described above and modifications thereof, and various improvements and changes can be made without departing from the subject matters described in the claims of this application and the equivalents thereof.

For example, the embodiments and Example described above provide the case where the negative electrode current collector 19 is resistance-welded to the smooth surface of the negative electrode plate 12 such that the smooth surface is located on the outer circumferential side in the negative electrode plate 12 of the wound electrode body 14. However, in a case where the wound electrode body 14 is produced by using a negative electrode core having front and back surfaces each with a surface roughness different from the other, the negative electrode current collector may be resistance-welded to the rough surface of the negative electrode plate such that the rough surface is located on the outer circumferential side of the negative electrode plate in the wound electrode body. Welding can be performed appropriately by employing suitable conditions even when the welding surface has a high surface roughness. Therefore, in the production of a large number of batteries, the surface with a large surface roughness may be used as a welding surface and suitable conditions may be employed for all the batteries. In this case, welding can be performed assuredly in most of these batteries, and the yield can be improved.

The method for connecting the positive electrode current collector and the positive electrode core-exposed portion is not limited. Examples of connection methods include resistance welding, ultrasonic welding, and welding by irradiation with energy rays such as a laser.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A method for producing a secondary battery that is a non-aqueous electrolyte secondary battery including a flat wound electrode body in which a positive electrode plate and a negative electrode plate are wound with a separator interposed therebetween, the negative electrode plate including a negative electrode core made of a copper foil or a copper alloy foil and a negative electrode active material mixture layer on each surface of the negative electrode core, the negative electrode core having a first surface and a second surface opposite the first surface, wherein a surface roughness of the first surface is less than a surface roughness of the second surface, the negative electrode core having a mixture layer-formed region where the negative electrode active material mixture layer is formed on each surface, and a negative electrode core-exposed portion where the negative electrode active material mixture layer is formed on neither of the surfaces, the negative electrode core-exposed portion being wound at one end portion of the wound electrode body in a winding axis direction, a current collector being connected by welding to an outer surface of the wound negative electrode core-exposed portion, the method comprising:

a step of forming the wound negative electrode core-exposed portion at one end portion in the winding axis direction to prepare the wound electrode body such that an outer surface of the wound negative electrode core-exposed portion consists of the first surface, and an inner surface of the wound negative electrode core-exposed portion consists of the second surface;

a step of placing the current collector on the outer surface of the wound negative electrode core-exposed portion and resistance-welding the current collector to the wound negative electrode core-exposed portion; and a step of enclosing the wound electrode body in a prismatic outer case comprising a prismatic outer body and a sealing plate, wherein the outer surface of the negative electrode core-exposed portion has a ten-point mean roughness Rz of 0.5 µm to 0.3 µm, and wherein a value obtained by subtracting the ten-point mean roughness Rz of the outer surface from a ten-point mean roughness Rz of the inner surface of the wound negative electrode core-exposed portion is 0.6 µm or more.

2. The method for producing a secondary battery according to claim 1, wherein the value obtained by subtracting the ten-point mean roughness Rz of the outer surface from the ten-point mean roughness Rz of the inner surface of the wound negative electrode core-exposed portion is 0.8 µm or more.

* * * * *